(12) United States Patent
Sakai

(10) Patent No.: US 11,822,332 B2
(45) Date of Patent: Nov. 21, 2023

(54) CONTROL APPARATUS, SYSTEM, COMPUTER-READABLE STORAGE MEDIUM, AND CONTROL METHOD

(71) Applicant: HONDA MOTOR CO., LTD., Tokyo (JP)

(72) Inventor: Rei Sakai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 199 days.

(21) Appl. No.: 17/185,993

(22) Filed: Feb. 26, 2021

(65) Prior Publication Data

US 2021/0286364 A1   Sep. 16, 2021

(30) Foreign Application Priority Data

Mar. 16, 2020   (JP) ................................ 2020-045700

(51) Int. Cl.
*G05D 1/02* (2020.01)
*G08G 1/01* (2006.01)
(Continued)

(52) U.S. Cl.
CPC ....... *G05D 1/0212* (2013.01); *G01C 21/3691* (2013.01); *G07C 5/0808* (2013.01); *G08G 1/0104* (2013.01); *G08G 1/091* (2013.01)

(58) Field of Classification Search
CPC .............. G05D 1/0212; G05D 1/0061; G01C 21/3691; G01C 21/3655; G07C 5/0808;
(Continued)

(56) References Cited

U.S. PATENT DOCUMENTS

2008/0154439 A1* 6/2008 Mira .................... G05D 1/0061
701/2
2012/0083964 A1   4/2012 Montemerlo
(Continued)

FOREIGN PATENT DOCUMENTS

CN           107430817 A      12/2017
CN           108137059 A       6/2018
(Continued)

OTHER PUBLICATIONS

Office Action issued for counterpart Chinese Application 202110249950.8, issued by The State Intellectual Property Office of People's Republic of China dated Sep. 1, 2023.

*Primary Examiner* — Vivek D Koppikar
*Assistant Examiner* — Dominick Mulder

(57) ABSTRACT

A control apparatus is for controlling notification data presented to an occupant of a movable object having an automated driving function, including an outside world information obtaining unit for obtaining outside world information of the movable object, a failure detection unit for detecting a failure of the movable object, a setting unit for setting a point associated with the failure based on the outside world information, and setting a scheduled time instant at which the point is reached, and a notification plan generation unit for generating a notification plan for setting an order for presenting predetermined notification data to the occupant according to the point and the scheduled time instant, wherein the notification plan generation unit is for estimating an information intensity of the notification data, and deciding an order for presenting detection information of the failure and the notification data in a predetermined period according to the information intensity.

19 Claims, 12 Drawing Sheets

(51) Int. Cl.
*G01C 21/36* (2006.01)
*G07C 5/08* (2006.01)
*G08G 1/09* (2006.01)

(58) Field of Classification Search
CPC ............... G08G 1/0104; G08G 1/091; G08G 1/096811; B60W 50/082; B60W 50/14; B60W 60/001
USPC .......................................................... 701/25
See application file for complete search history.

(56) References Cited

U.S. PATENT DOCUMENTS

| | | | |
|---|---|---|---|
| 2012/0182832 A1* | 7/2012 | Eperjesi | G01V 1/223 367/77 |
| 2014/0052328 A1* | 2/2014 | Nguyen | G07C 5/0808 701/29.6 |
| 2014/0336919 A1* | 11/2014 | Li | G01C 21/3697 701/400 |
| 2017/0221069 A1* | 8/2017 | Remboski | G07C 5/0825 |
| 2017/0270490 A1* | 9/2017 | Penilla | G07C 5/006 |
| 2018/0023966 A1 | 1/2018 | Iwai | |
| 2018/0218547 A1* | 8/2018 | Kalyanaraman | G07C 5/0825 |
| 2018/0276912 A1* | 9/2018 | Zhou | G05B 23/0275 |
| 2019/0007546 A1* | 1/2019 | Anderson | H04M 1/72454 |
| 2019/0009773 A1 | 1/2019 | Miyahara | |
| 2019/0035266 A1 | 1/2019 | Riess | |
| 2019/0054928 A1* | 2/2019 | Hatano | G05D 1/0088 |
| 2020/0076939 A1* | 3/2020 | Lambourne | H04M 1/72415 |
| 2020/0207373 A1* | 7/2020 | Kitagawa | G08G 1/00 |
| 2020/0258323 A1* | 8/2020 | Colvin | G07C 5/006 |
| 2021/0122362 A1* | 4/2021 | Okamura | B60W 60/001 |
| 2022/0101666 A1* | 3/2022 | Simonis | G07C 5/0816 |
| 2022/0207932 A1* | 6/2022 | Ponda | B64U 50/13 |

FOREIGN PATENT DOCUMENTS

| | | |
|---|---|---|
| CN | 109307514 A | 2/2019 |
| JP | 2016133328 A | 7/2016 |
| JP | 2017224346 A | 12/2017 |
| JP | 2018165888 A | 10/2018 |

* cited by examiner

| TYPE | AUTOMATED DRIVING LEVEL | | | | | |
|---|---|---|---|---|---|---|
| | 5 | 4 | 3 | 2 | 1 | 0 |
| ROAD A | 6 | 6 | 6 | 6 | 6 | 6 |
| ROAD B | 5 | 5 | 5 | 5 | 5 | 5 |
| ROAD C | 4 | 4 | 4 | 4 | 4 | 4 |
| FAILURE C | 6 | 6 | 6 | 6 | 6 | 6 |
| FAILURE B | 5 | 5 | 5 | 5 | 5 | 5 |
| FAILURE C | 4 | 4 | 4 | 2 | 2 | 2 |
| ADVERTISEMENT A | 3 | 3 | 3 | 2 | 2 | 2 |
| ADVERTISEMENT B | 2 | 2 | 2 | 2 | 2 | 2 |
| ADVERTISEMENT C | 1 | 1 | 1 | 0 | 0 | 0 |
| NEWS A | 3 | 3 | 3 | 2 | 2 | 2 |
| NEWS B | 2 | 2 | 2 | 1 | 1 | 0 |
| NEWS C | 1 | 1 | 1 | 0 | 0 | 0 |
| SMALL TALK | 1 | 1 | 1 | 0 | 0 | 0 |

*FIG. 8*

CONTROL APPARATUS, SYSTEM, COMPUTER-READABLE STORAGE MEDIUM, AND CONTROL METHOD

CROSS REFERENCE TO RELATED APPLICATION

The contents of the following Japanese patent application are incorporated herein by reference, Japanese Patent Application No. 2020-045700 filed on Mar. 16, 2020.

BACKGROUND

1. Technical Field

The present invention relates to a control apparatus, a system, a computer-readable storage medium, and a control method.

2. Related Art

Patent document 1 describes "setting of a route in which a section where automated drive can be performed and a section where the automated drive is not performed are not mixed".

CITATION LIST

Patent Document

[Patent document 1] Japanese Unexamined Patent Application Publication No. 2016-133328

BRIEF DESCRIPTION OF THE DRAWINGS

FIG. 8 illustrates an information intensity for each type of notification data.

DESCRIPTION OF EXEMPLARY EMBODIMENTS

Hereinafter, the present invention will be described by way of exemplary embodiments of the invention, but the following embodiments are not intended to restrict the invention according to the claims. In addition, not all combinations of features described in the embodiments necessarily have to be essential to solving means of the invention.

Figure 1:
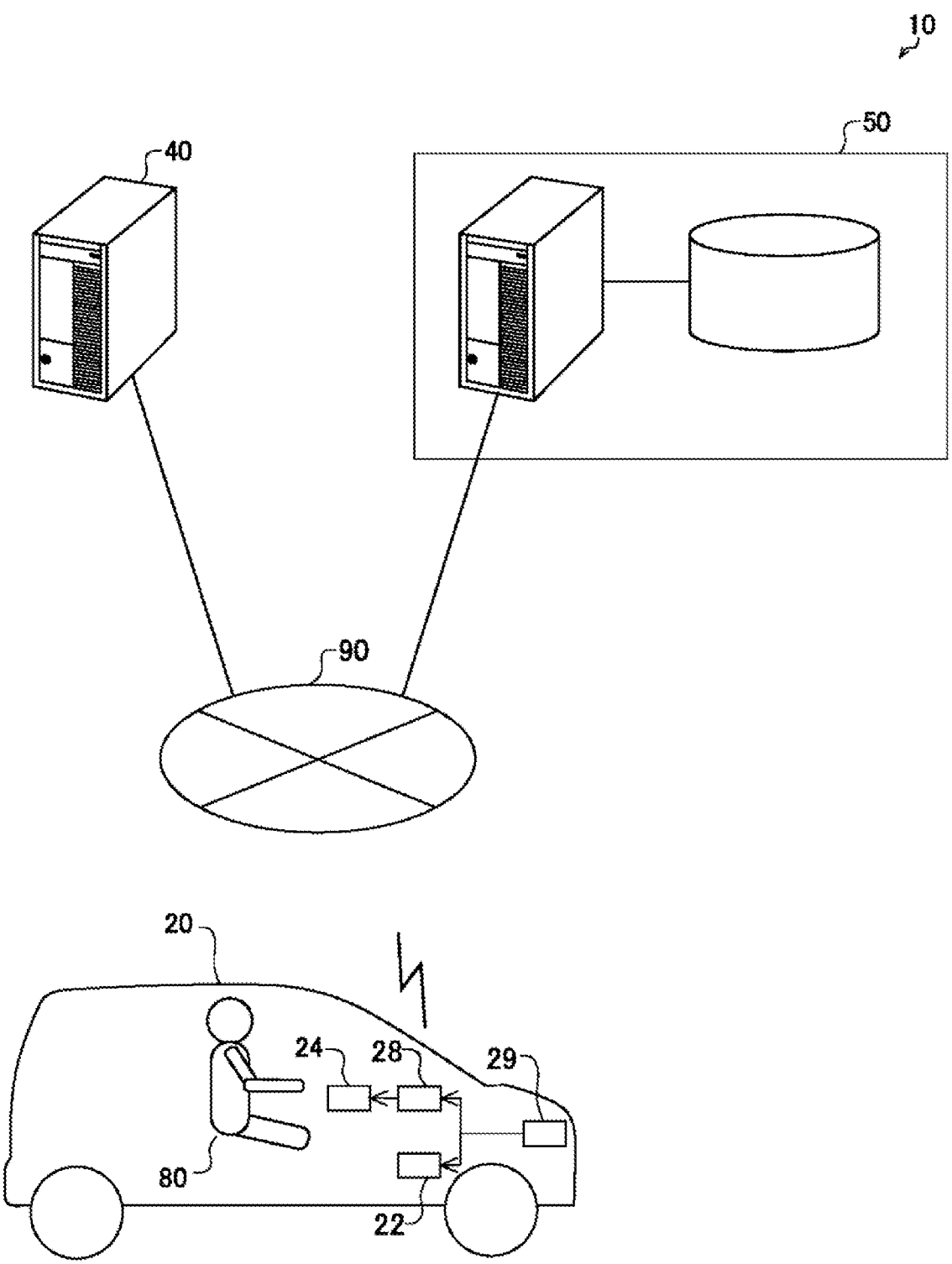
FIG. 1 schematically illustrates a configuration of a system 10.

FIG. 1 schematically illustrates a configuration of a system 10. The system 10 is provided with a movable object 20, a notification server 40, and a content server 50. The system 10 is a system configured to provide the movable object 20 with notification data.

The movable object 20, the notification server 40, and the content server 50 are connected to a network 90. The network 90 includes a communication line such as the Internet or a mobile communication network. The notification server 40 communicates with the content server 50 and the movable object 20 through the network 90.

The content server 50 obtains and stores, in a database, video data and text data provided by video distribution services on the network 90, text data and image data such as still image data and video data included in posted information on social network services (SNS), and image data and text data included in web pages and the like. In addition, the content server 50 obtains and stores, in the database, audio data, text data, and image data distributed through television broadcast and radio broadcast. The content server 50 obtains and stores, in the database, advertisement data from an advertisement distribution company. In addition, the content server 50 obtains and stores, in the database, news information from news providing company. The content server 50 sends content data to the notification server 40 according to a request from the notification server 40.

The content data may include, for example, time instant information, location information, and phenomenon information. The time instant information indicates a time instant associated with the phenomenon information. The location information indicates a location associated with the phenomenon information. The phenomenon information includes weather information, accident information, event information, roadwork information, traffic jam information, advertisement information, news information, and the like.

The movable object 20 has an automated driving function. The movable object 20 is provided with an automated drive control apparatus 22, a notification apparatus 24, a communication apparatus 28, and a sensor 29. The sensor 29 is provided with a radar, a camera, a positioning apparatus, a speed sensor, and the like. The automated drive control apparatus 22 is configured to provide the movable object 20 with the automated driving function. For example, the automated drive control apparatus 22 controls steering or acceleration and deceleration of the movable object 20 in an automated manner. The automated drive control apparatus 22 uses information obtained by the sensor 29 to control the steering or the acceleration and deceleration of the movable object 20 in an automated manner. The automated driving function by the automated drive control apparatus 22 may be an automated driving function for controlling the steering and the acceleration and deceleration in a mode in which an intervention degree to the driving by the system is increased. In this case, since an intervention degree to the driving by an occupant of the movable object 20 is relatively decreased, an attention degree of the occupant to a notification tends to be increased, which is preferable to provision of notification data. The automated drive control apparatus 22 may have a function of advanced driver-assistance systems (ADAS). The automated drive control apparatus 22 is implemented, for example, by an electronic control unit (ECU) provided with a microcomputer. The communication apparatus 28 communicates with the notification server 40 through the network 90. The communication apparatus 28 is configured to send destination information of the movable object 20 to the notification server 40. In addition, the communication apparatus 28 sends location information of the movable object 20, speed information of the movable object 20, control information related to the automated driving function of the movable object 20, image information of a surrounding of the movable object 20, and information related to the occupant 80 of the movable object 20 which are obtained by the sensor 29, and the like to the notification server 40. The communication apparatus 28 may be configured by including a telematics control unit (TCU). The occupant 80 may be a driver of the movable object 20.

The notification server 40 is configured to generate notification data based on information collected from a plurality of movable objects including the movable object 20 and information received from the content server 50. For example, based on a destination of the movable object 20, the notification server 40 specifies a route scheduled to be travelled to the destination. The notification server 40 decides automated driving levels of the movable object 20 in a plurality of sections in the route scheduled to be travelled based on road information of the route scheduled to be travelled. Note that automated driving levels of SAE J3016 may be applied as the automated driving levels, for example. In this case, an automated driving level 0 to an automated driving level 2 may correspond to a driver-led manual driving mode, and an automated driving level 3 to an automated driving level 5 may correspond to an automated driving mode led by the automated drive control apparatus 22.

In addition, the notification server 40 sets a passing point on the route scheduled to be travelled by the movable object 20. The notification server 40 obtains, from the content server 50, contents serving as a base of notification data provided to the occupant 80 based on information on a point where the automated driving level is switched and the passing point, occupant information obtained from the movable object 20, and the like, and generates the notification data. For example, the notification server 40 obtains content data which is associated with a switching point of the automated driving level of the movable object 20 and also associated with a time instant at which the movable object 20 passes the switching point, and generates a notification plan for setting timing of the notification data to be sent to the movable object 20. For example, the notification server 40 decides timing for presenting the notification data for switching the automated driving level. In addition, the notification server 40 decides a time instant and a duration for presenting the notification data. According to travelling of the movable object 20, the notification server 40 generates the notification data in accordance with the travel plan, and sends the notification data to the movable object 20.

In the movable object 20, when the communication apparatus 28 receives the notification data from the notification server 40, the notification apparatus 24 presents the notification data received by the communication apparatus 28 to the occupant 80. For example, the notification apparatus 24 has a human machine interface (HMI) function, and the notification apparatus 24 is configured to present the notification data in a form of audio information and image information. According to the system 10, the notification data related to the point where the movable object 20 travels and the switching of the automated driving level of the movable object 20 can be presented to the occupant 80 at an appropriate timing.

Figure 2:
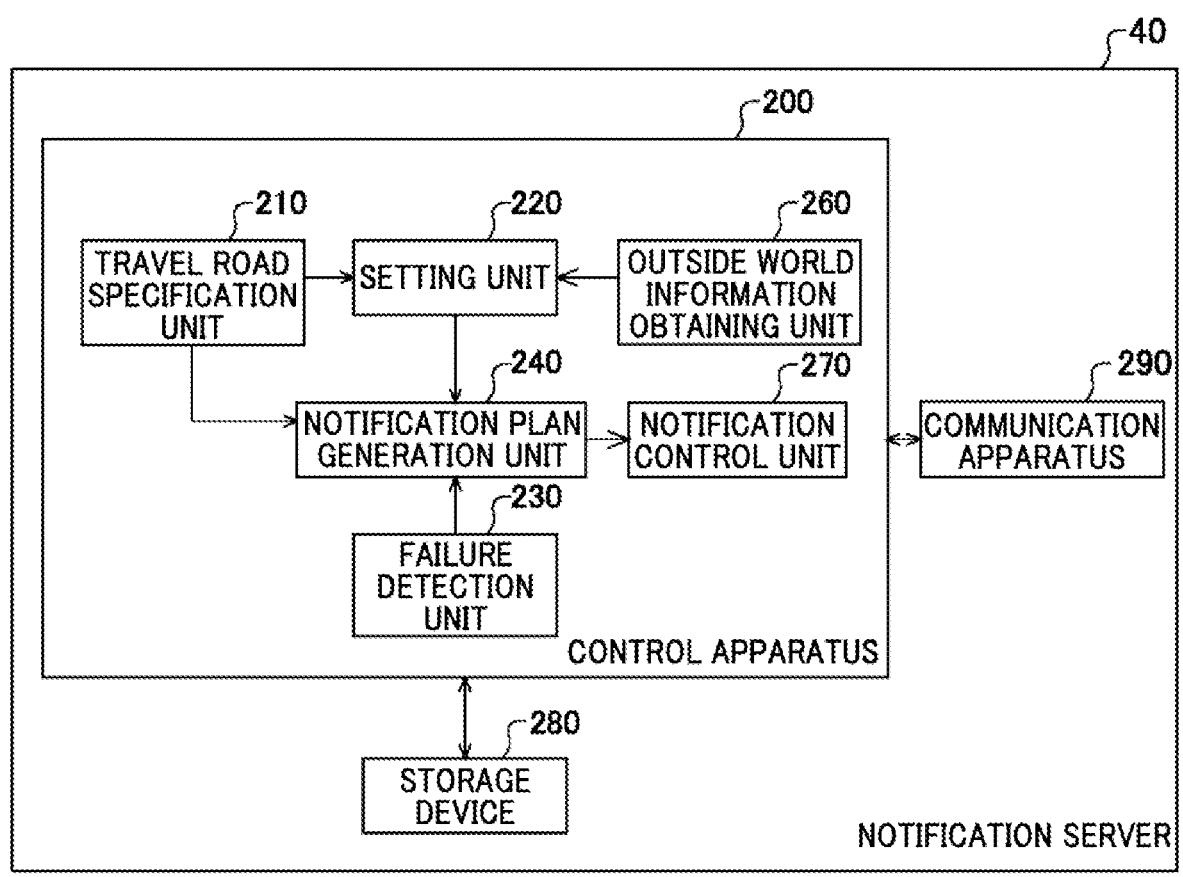
FIG. 2 illustrates a system configuration of a notification server 40.

FIG. 2 illustrates a system configuration of the notification server 40. The notification server 40 is provided with a control apparatus 200, a storage device 280, and a communication apparatus 290. The control apparatus 200 is implemented, for example, by being provided with an arithmetic processing unit including a processor. The storage device 280 is implemented by being provided with a non-volatile storage medium. The control apparatus 200 is configured to perform processing using information stored in the storage device 280. The communication apparatus 290 plays a role to communicate with the movable object 20 and the content server 50.

The control apparatus 200 controls notification data presented to the occupant 80 of the movable object 20 having the automated driving function. The control apparatus 200 is provided with a travel road specification unit 210, a setting unit 220, a notification plan generation unit 240, a notification control unit 270, a failure detection unit 230, and an outside world information obtaining unit 260.

The travel road specification unit 210 is configured to specify a road scheduled to be travelled by the movable object 20 corresponding to the destination set for the movable object 20. Note that the travel road specification unit 210 may obtain, from the movable object 20, information on the road scheduled to be travelled which is decided by a car navigation system included in the movable object 20.

The outside world information obtaining unit 260 is configured to obtain outside world information of the movable object 20. The outside world information may include traffic information, for example. The outside world information obtaining unit 260 may obtain information obtained by the sensor 29 included in the movable object 20 as the outside world information. The outside world information obtaining unit 260 may obtain information obtained by sensors included in a plurality of other movable objects as the outside world information. The outside world information obtaining unit 260 may obtain the outside world information from an external server.

The failure detection unit 230 is configured to detect a failure of the movable object 20. The failure detection unit 230 detects the failure of the movable object 20 during the automated drive of the movable object 20. In a case where the movable object 20 travels at an automated driving level higher than a predetermined automated driving level, the failure detection unit 230 detects the failure of the movable object 20 based on an output value of an actuator included in the movable object 20.

The travel road specification unit 210 specifies the road scheduled to be travelled by the movable object 20 corresponding to a destination set for the movable object 20. The setting unit 220 is configured to set, according to the road scheduled to be travelled, a point for switching from the automated drive to the driver-led manual drive on the road scheduled to be travelled based on the outside world information, and set a scheduled time instant at which the point is passed. The notification plan generation unit 240 is configured to estimate an information intensity of the notification data, and decide an order for presenting detection information of the failure and the notification data in a predetermined period of the scheduled time instant according to the information intensity.

In addition, the setting unit 220 sets a point associated with the failure on the road scheduled to be travelled by the movable object 20 according to the road scheduled to be travelled based on the outside world information, and sets a scheduled time instant at which the point is reached. The point associated with the failure is, for example, a point where a sales outlet or a handing shop of the movable object (which will be referred to as a dealer in the present embodiment), a repair center of the movable object, a car rental shop, a parts shop of the movable object, or the like exists. The notification plan generation unit 240 is configured to generate a notification plan for setting an order for presenting predetermined notification data to the occupant 80 of the movable object 20 according to the point and the scheduled time instant. The notification plan generation unit 240 is configured to incorporate the detection information of the failure into the notification plan according to the point.

The notification control unit 270 is configured to cause presentation based on the notification data in accordance with the notification plan generated by the notification plan generation unit 240. For example, the notification control unit 270 causes notification to the occupant 80 by sending the notification data to the movable object 20 via the communication apparatus 290. The notification control unit 270 may cause change notice of the automated driving mode to the occupant 80 at the switching recommendation point according to the automated driving mode set for the road scheduled to be travelled.

The notification plan generation unit 240 is configured to arrange the notification data in an ascending order of the information intensity increasing stepwise in a predetermined period before the scheduled time instant, and arrange the detection information of the failure to be adjacent to the notification data having the information intensity higher than a predetermined value. The notification data may include advertisement data, and the information intensity of the detection information of the failure may be higher than the information intensity of the advertisement data. Different information intensities may be set in the notification information of the failure depending on a type of the failure.

The automated driving function has a plurality of automated driving modes according to an operation amount of the automated drive control apparatus 22 included in the movable object 20. The notification plan generation unit 240 sets the notification data corresponding to the automated driving mode set for the road scheduled to be travelled. Automated driving levels of SAE J3016 described in the present embodiment are one example of the automated driving modes.

The movable object 20 can set a home location. The home location is, for example, a base of the movable object 20. The home location is, for example, a resident or the like of the occupant 80. A travel mode of the movable object 20 is provided with an outgoing travel mode where a destination is set in a direction in which the movable object 20 departs from the home location, and an incoming travel mode where a destination is set in a direction in which the movable object 20 approaches the home location. In a case where a predetermined action is not taken a predetermined number of times or more in response to notification on the detection information of the failure in the outgoing travel mode, the notification plan generation unit 240 is configured to suppress the notification on the detection information of the failure in the incoming travel mode.

The failure detection unit 230 may detect a failure expected to occur in the future. When a failure is expected to occur in a predetermined time or later in the future, the notification plan generation unit 240 may generate a notification plan for a period longer than a predetermined length which is a notification plan for notification on the failure in a case where the movable object 20 travels at an automated driving level higher than a predetermined automated driving level. In a case where the movable object 20 travels at the automated driving level higher than the predetermined automated driving level, the failure detection unit 230 may specify timing at which the failure is expected to occur in the future based on an output value of the actuator included in the movable object 20. The notification plan generation unit 240 may generate a notification plan for a period longer than the predetermined length based on the predicted timing in the failure detection unit 230.

Figure 3:
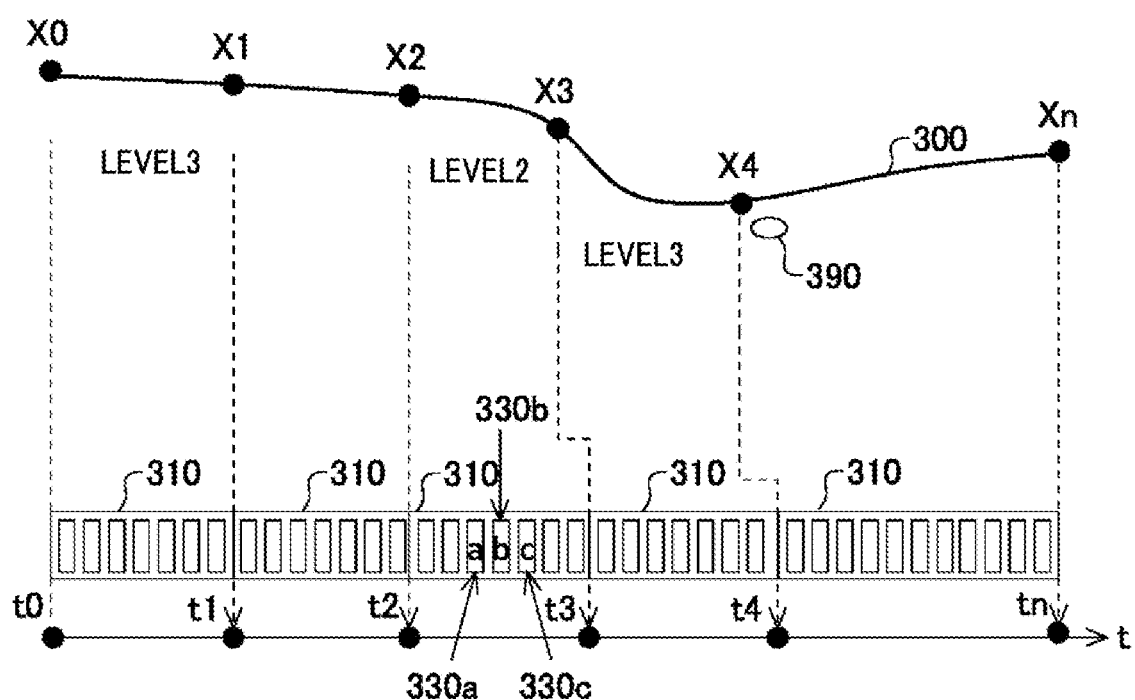
FIG. 3 is a diagram for describing a unit of management (management unit) in which notification data is set.

FIG. 3 is a diagram for describing the management unit in which notification data is set. A point X0 is a point of departure of the movable object 20. A point Xn is a destination of the movable object 20. A road scheduled to be travelled 300 is a road where the movable object 20 is scheduled to travel. The road scheduled to be travelled 300 is decided by the travel road specification unit 210.

The setting unit 220 sets a plurality of points including points X1 to X4 on the road scheduled to be travelled 300. For example, in a case where the setting unit 220 decides that the movable object 20 travels on a road from the point X0 to the point X2 at the automated driving level 3, the movable object 20 travels from the point X2 to the point X3 at the automated driving level 2, and the movable object 20 travels from the point X3 to the point X4 at the automated driving level 3, the setting unit 220 sets X2 and X3 as the switching recommendation points for switching the automated driving level.

In addition, in a case where a distance between the point X0 and the point X2 exceeds a predetermined distance, the setting unit 220 sets the point X1 between the point X0 and the point X2. For example, the setting unit 220 may decide the point X1 according to a travel time of the movable object 20. For example, the setting unit 220 may decide a point where the movable object 20 has travelled for approximately 1 hour from the point X0 as X1. In addition, the setting unit 220 sets, on the road scheduled to be travelled 300, the point X4 near a point where a specific spot 390 such as a tourist attraction or a facility exists.

The notification plan generation unit 240 sets one management unit 310 in each of a plurality of periods separated by time instants corresponding to the points set by the setting unit 220. The notification plan generation unit 240 sets a plurality of pieces of notification data 330 in each of the management units 310. As one example, the notification plan generation unit 240 sets notification data 330*c* for notifying the occupant 80 of the switching of the automated driving level in a management unit ahead of timing corresponding to the switching recommendation point X2. In addition, the notification plan generation unit 240 sets notification data 330*b* serving as advertisement data and notification data 330*a* serving as news data before the notification data 330*c*. The notification plan generation unit 240 selects the advertisement data and the news data to be set as the notification data 330 in the management unit based on interest information of the occupant 80 and a point where the movable object 20 exists at a notification timing. In this manner, the notification plan generation unit 240 generates the notification plan in advance based on the switching recommendation point of the automated driving level, and the notification control unit 270 causes transmission of the notification data to the movable object 20 in accordance with the notification plan generated by the notification plan generation unit 240.

Figure 4:
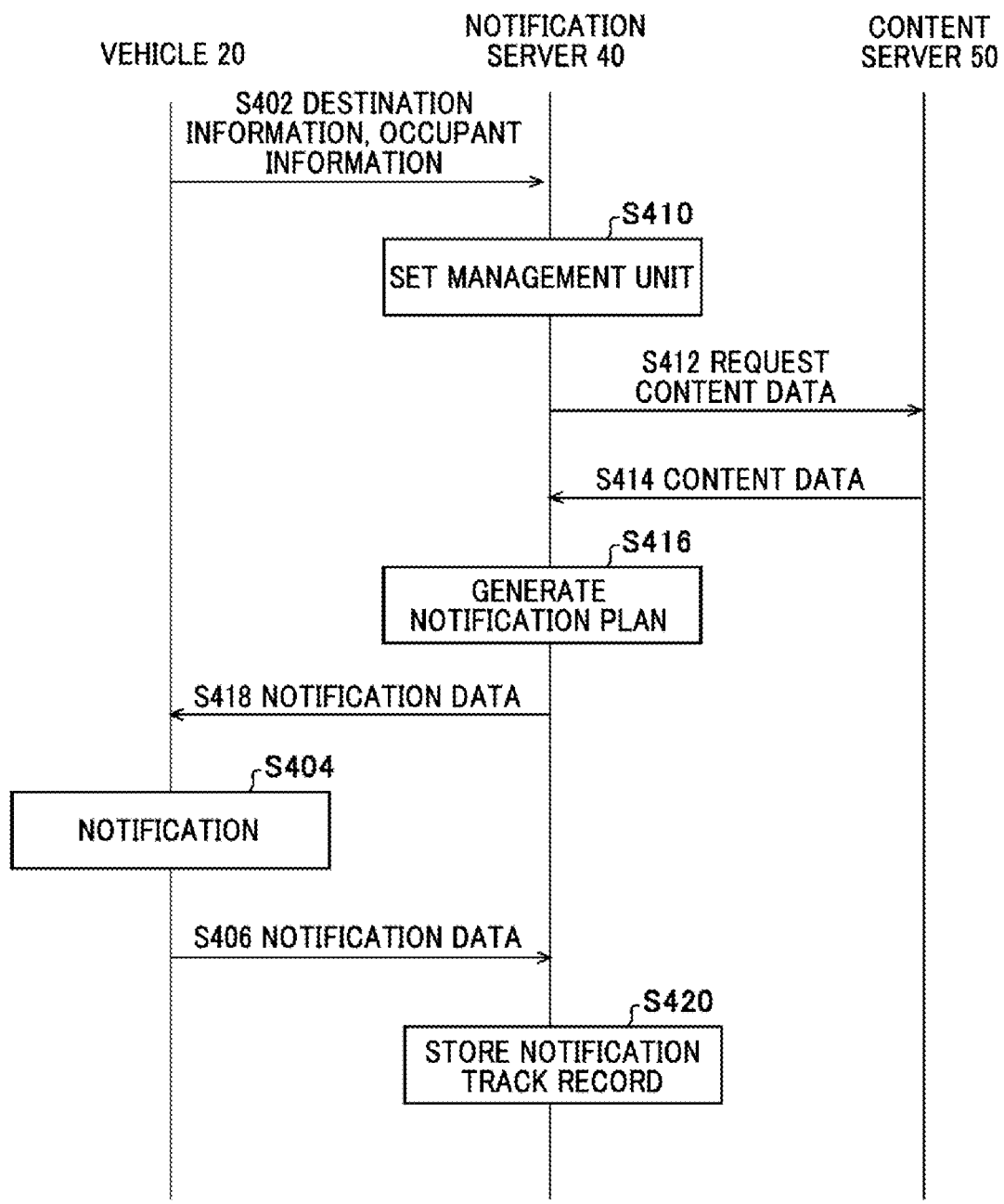
FIG. 4 illustrates a flow of data among a movable object 20, the notification server 40, and a content server 50.

FIG. 4 illustrates a flow of data among the movable object 20, the notification server 40, and the content server 50. In 5402, the communication apparatus 28 sends the destination information set by the occupant 80 and information of the occupant 80 to the notification server 40. The information of the occupant 80 may include identification information of the occupant 80, interest information of the occupant 80, or the like. In 5410, the notification plan generation unit 240 sets the management unit. Specifically, the travel road specification unit 210 sets the road scheduled to be travelled based on the destination and the road information, the setting unit 220 sets the automated driving levels of the movable object 20, the switching recommendation points X, and time instants when the movable object 20 passes the points X at the respective spots, and the notification plan generation unit 240 sets the management unit.

In 5412, the communication apparatus 290 is configured to send request information for content data associated with the point on the road scheduled to be travelled to the content server 50. In 5414, the communication apparatus 290 receives the content data from the content server 50. In 5416, the notification plan generation unit 240 generates notification data based on the content data, and assigns the notification data into the management unit. In 5418, the communication apparatus 290 sends the notification data to the movable object 20. In 5404, the notification apparatus 24 presents notification to the occupant 80 in accordance with the received notification data. In a case where the notification data is advertisement data, after the notification apparatus 24 presents the notification, in 5406, the communication apparatus 28 sends, to the notification server 40, information indicating that the notification data has been presented. In 5420, the notification server 40 stores notification track record information indicating the completion of the notification in the storage device 280. The notification server 40 charges a business operator who has provided the content data based on the notification track record information.

Figure 5:
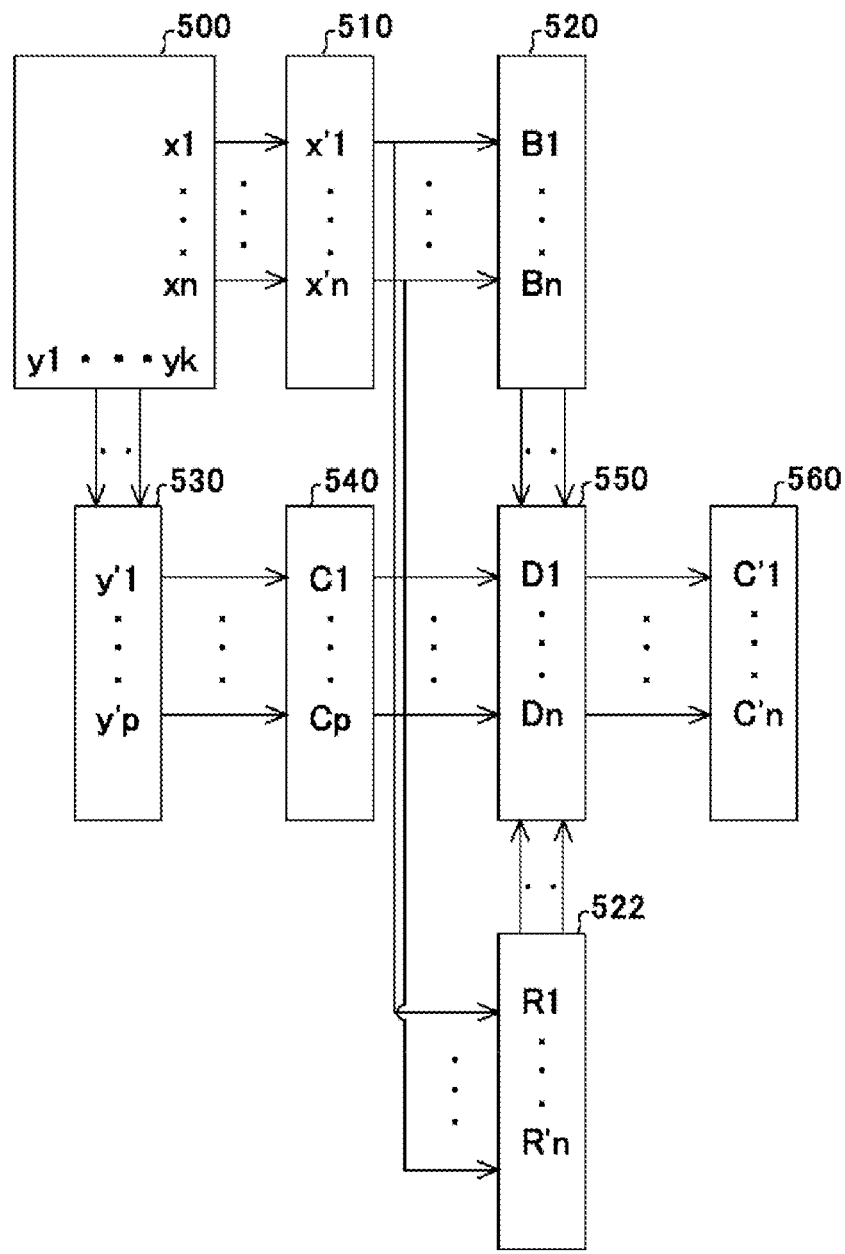
FIG. 5 illustrates one example of a generation flow of a notification plan.

FIG. 5 illustrates one example of a generation flow of the notification plan. The setting unit 220 generates passing point information x (x1 to xn) and switching recommendation point information y (y1 to yk) based on information of the road scheduled to be travelled specified by the travel road specification unit 210 based on a current location and a destination of the movable object 20 (block 500). The setting unit 220 specifies point information x' (x'1 to x'n) associated with the passing point information x (block 510). The notification plan generation unit 240 generates notification data B (B1 to Bn) based on the point information x' (block 520). The notification data B may be notification data generated, for example, from the content data locally managed by the notification server 40 itself. In addition, the notification plan generation unit 240 obtains notification data R and R' (R1 to Rn, R'1 to R'n) based on the point information associated with the passing point information x (block 522). The notification data R may be notification data generated, for example, from content data obtained from the content server 50.

The notification plan generation unit 240 specifies point information y' (y'1 to y'p) associated with the switching recommendation point y (block 530). The notification plan generation unit 240 obtains notification data C (C1 to Cp) based on the point information y' (block 540). The notification data C may be notification data generated from the content data obtained from the content server 50. The notification data C may be notification data generated by the notification server 40. For example, the notification data C may be notification data for notification on the switching of the automated driving level.

The notification plan generation unit 240 generates a set D (D1 to Dn) of the notification data B, the notification data R, and the notification data C (block 550). The notification plan generation unit 240 decides an order of the notification data to be set in the management unit from the set D, and sets the notification data (C'1 to C'q) in the management unit (block 560). In this manner, the notification plan generation unit 240 generates the notification plan.

Figure 6:
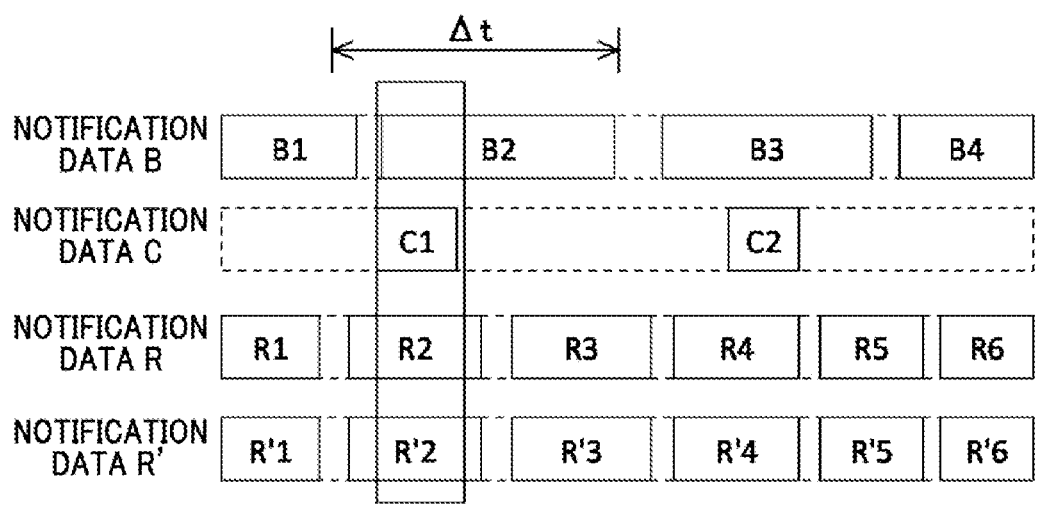
FIG. 6 illustrates another example of the generation flow of the notification plan.

FIG. 6 illustrates another example of the generation flow of the notification plan. The notification data B, the notification data C, the notification data R, and the notification data R' are the notification data generated by a method similar to the method described in association with FIG. 4. The notification plan generation unit 240 arranges the notification data B in accordance with predetermined criteria in a time series manner. Similarly, the notification plan generation unit 240 arranges the notification data C in accordance with predetermined criteria in a time series manner. In addition, the notification plan generation unit 240 arranges the notification data R in accordance with predetermined criteria in a time series manner. In addition, the notification plan generation unit 240 arranges the notification data R' in accordance with predetermined criteria in a time series manner. In a case where the notification data to be presented in a future period Δt is selected, the notification plan generation unit 240 selects and presents one piece of notification data among a plurality of pieces of notification data arranged in Δt. For example, the notification plan generation unit 240 selects one piece of notification data among a plurality of pieces of notification data B2, C1, R2, and R'2.

Note that the notification plan generation unit 240 may select one piece of notification data based on priority information associated with each of the plurality of pieces of notification data. In addition, the notification plan generation unit 240 may select a plurality of pieces of notification data. For example, the notification plan generation unit 240 may select the notification data C1 and the notification data R2 as the notification data to be presents in Δt. In this case, the notification plan generation unit 240 may perform such a setting that the notification data C1 and the notification data R2 are shifted in the period Δt to be presented.

In this manner, the notification plan generation unit 240 may generate the plurality of notification plans including the plurality of pieces of notification data from the current location, the passing location, or the destination of the movable object 20, and select and present the notification data corresponding to the switching recommendation point among the plurality of pieces of notification data included in the plurality of generated notification plans.

Figure 7:
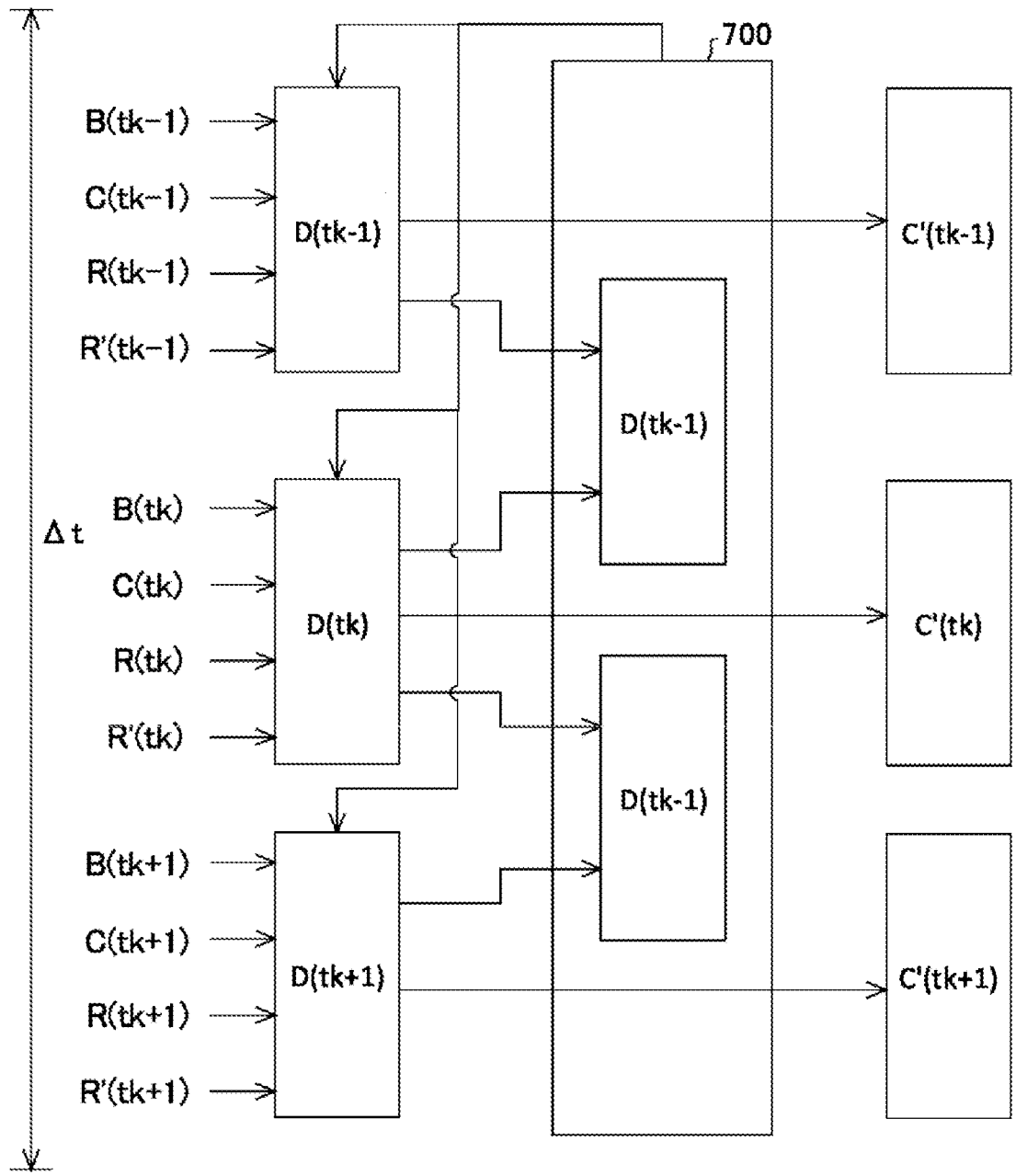
FIG. 7 illustrates another example of the generation flow of the notification plan.

FIG. 7 illustrates another example of the generation flow of the notification plan. The notification data B, the notification data C, the notification data R, and the notification data R' are notification data generated by a method similar to the method described in association with FIG. 4. In addition, in FIG. 7, characters in brackets in each of the notification data B, the notification data C, the notification data R, and the notification data R' represent a time instant. For example, B(tk) denotes the notification data selected as the notification data that may be presented at a time instant tk in accordance with the predetermined criteria.

The notification plan generation unit 240 temporarily selects notification data D (D(tk−1), D(tk), D(tk+1)) that should be presented at each time instant (tk−1, tk, tk+1) in the period Δt. The notification plan generation unit 240 obtains the notification data D in a time series manner to obtain differential information (block 700), and selects the notification data selected as the notification data D such that the differential information satisfies a predetermined condition. For example, in a case where the automated driving level is associated with the notification data, the notification plan generation unit 240 may set a rate of change of the automated driving level per unit time to be below a predetermined value. The association between the notification data and the automated driving level will be described below. In addition, in a case where information intensity of the notification data is associated with the notification data, the notification plan generation unit 240 may set a rate of change of the information intensity per unit time to be equal to or higher than a predetermined value. The information intensity may be associated with the notification data in advance according to the contents presented as the notification data, for example. The notification plan generation unit 240 may set a provided amount of the notification data per unit time which is generated from the advertisement data to be equal to or higher than a predetermined value.

In a case where a combination of the notification data D in which the differential information satisfies a predetermined condition is found, the notification plan generation unit 240 decides the notification data D as the notification data C' to be presented. Note that in a case where the combination of the notification data D satisfying the predetermined condition is not decided, the setting unit 220 may change the automated driving level of the movable object 20 and search for the notification data D again. In addition, in a case where the notification data satisfying the predetermined condition is not decided, the travel road specification unit 210 may change the road scheduled to be travelled by the movable object 20 and search for the notification data D again.

FIG. 8 illustrates an information intensity for each type of the notification data. The information intensity is set using a value between 0 and 6. It is indicated that as the value of the information intensity is higher, the information intensity of the notification data of the correspond type is higher. The information intensity is set for each of the automated driving levels. The information intensity 0 indicates that the notification data of the corresponding type is not presented. For example, the information intensity 0 indicates that the information does not have importance at the corresponding automated driving level.

Regarding the type of the notification data, a "road A" represents notification data associated with a change of the automated driving level. For example, the "road A" includes the notification data for notification on the change of the automated driving level. In the "road A", the information intensity 6 is set for all the automated driving levels.

A "road B" represents notification data affecting the automated drive. The "road B" includes notification data for notification on occurrence of an accident or the like. In the "road B", the information intensity 5 is set for all the automated driving levels.

A "road C" represents notification data associated with a change of the destination. For example, the "road C" includes notification data for notification on occurrence of fire at the destination, notification data for notification on a hazardous weather at the destination, notification data for notification on a possibility of a severe delay of the arrival at the destination, or the like. In the "road C", the information intensity 4 is set for all the automated driving levels.

A "failure A", a "failure B", and a "failure C" represent notification data associated with a failure of the movable object 20. The "failure A", the "failure B", and the "failure C" may include, for example, notification data for notification on detection of a failure. The "failure A", the "failure B", and the "failure C" may include, for example, notification data for notification on a point associated with repair of the detected failure or servicing of the movable object 20 such as a dealer, a repair center, or a parts shop of the movable object.

The "failure A" may include notification data related to a failure in which the failure of the movable object 20 may occur in a predetermined period. The "failure A" may include notification data for notification on a failure related to travelling of the movable object 20. The "failure A" may include notification data related to a failure that may occur in a predetermined period among failures related to the travelling of the movable object 20. In the "failure A", the information intensity 6 is set for all the automated driving levels.

The "failure B" may include notification data related to a failure in which the failure may occur in the future after a period longer than a predetermined period. The "failure B" may include notification data for notification on a failure related to travelling of the movable object 20. The "failure B" may include notification data related to a failure of the movable object 20 which may occur in a predetermined period among failures related to an auxiliary machine that is not associated with the travelling of the movable object 20, such as a failure of an air conditioner. The "failure B" may include notification data related to a failure that may occur in the future after a period with a predetermined length among the failures associated with the travelling of the movable object 20. In the "failure B", the information intensity 5 is set for all the automated driving levels.

The "failure C" may include notification data related to a failure that may occur in the future after a period with a predetermined length among failures that may occur in the future after a period with a predetermined length. In the "failure C", the information intensity 4 is set for the automated driving levels at and above level 3, and the lower information intensity 2 is set for the automated driving level 2 or below. In this manner, the information intensity of the notification data related to the failure is set according to the type of the failure or the period until the failure occurs.

In the "road A" and the "failure A", the information intensity is set to be higher than the notification data of any other types.

An "advertisement A" represents advertisement data in which it is presumed that the occupant 80 has an interest. The advertisement in which it is presumed that the occupant 80 has the interest may be specified based on history information of the destinations of the occupant 80, a change of facial expression of the occupant 80 in a case where the notification data of the advertisement data is presented, or the like. In the "advertisement A", the information intensity 3 is set for the automated driving levels at and above level 3, and the lower information intensity 2 is set for the automated driving level 2 or below.

An "advertisement B" represents advertisement data related to a point in proximity to the road scheduled to be travelled. The "advertisement B" includes advertisement data at the point in proximity to the road scheduled to be travelled by the movable object 20. In the "advertisement B", the information intensity 2 is set for all the automated driving levels.

An "advertisement C" represents advertisement data that does not correspond to any of the "advertisement A" and the "advertisement B". In the "advertisement C", the information intensity 1 is set for the automated driving levels at and above level 3, and the information intensity 0 is set for the automated driving level 2 or below. For this reason, in a case where the automated driving level is 2 or below, the notification data corresponding to the "advertisement C" is not presented.

"News A" represents news data in which it is presumed that the occupant 80 has an interest. Whether this data is news data in which it is presumed that the occupant 80 has the interest may be specified based on the change of the facial expression of the occupant 80 when the news data is presented, or the like. In the "news A", the information intensity 3 is set for the automated driving level 3 or above, and the lower information intensity 2 is set for the automated driving level 2 or below.

"News B" represents news data related to a point in proximity to the road scheduled to be travelled. The "news B" includes news data for notification on news occurring at the destination of the movable object 20. In the "news B", the information intensity 2 is set for the automated driving level 3 or above, the lower information intensity 1 is set for the automated driving levels 2 and 1, and the information intensity 0 is set for the automated driving level 0. For this reason, in a case where the automated driving level is 0, the notification data corresponding to the "news B" is not presented.

"News C" represents news data that does not correspond to any of the "news A" and the "news B". A "small talk" is notification data presented accompanying with a chat such as an SNS, a conversation system, and a conversation. In the "news C" and the "small talk", the information intensity 1 is set for the automated driving level 3 or above, and the lower information intensity 0 is set for the automated driving level 2 or below. For this reason, in a case where the automated driving level is 2 or below, the presentation of the notification data of the "news C" and the notification data of the "small talk" is not permitted.

Note that a "type" is one example of an "information attribute". In addition, an "information intensity" is one example of the "information attribute". The "information attribute" may be a combination of the "type" and the "information intensity".

In a case where the notification data is set in the management unit, the notification plan generation unit 240 refers to intensity information and decides an order for setting the notification data such that a change on a time sequence of the information intensity satisfies a predetermined condition.

Figure 9:
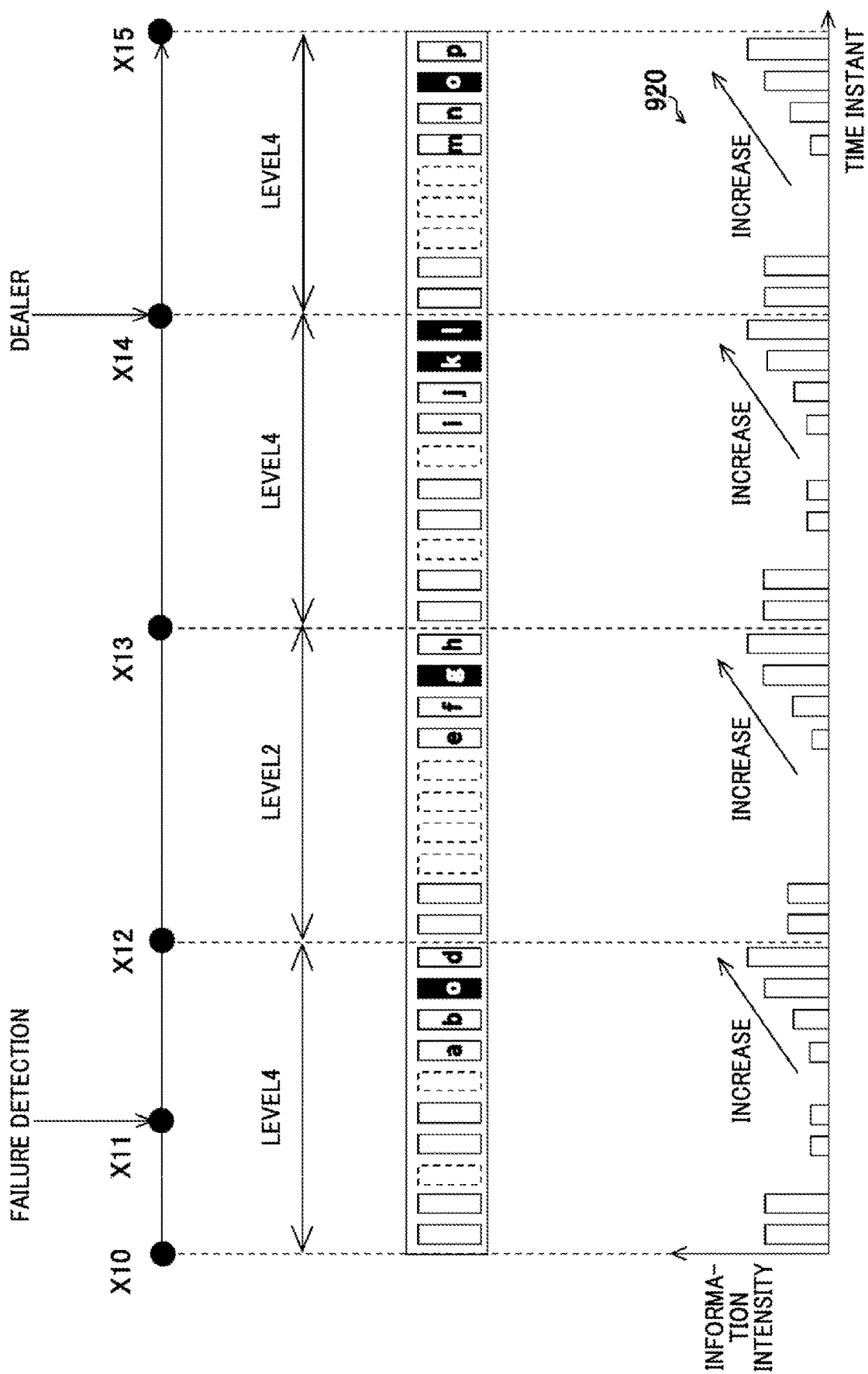
FIG. 9 illustrates a notification plan set in a case where a failure detection unit 230 detects a failure.

FIG. 9 illustrates a notification plan set in a case where the failure detection unit 230 detects a failure. In FIG. 9, a point X10 is a home point of the movable object 20. For example, the point X10 is a point where a resident of the occupant 80 exists. The movable object 20 is set to travel at the automated driving level 4 from the point X10 corresponding to a point of departure to a point X12, and set to travel at the automated driving level 2 from the point X12 to a point X13. It is assumed that the movable object is set to travel at the automated driving level 4 from the point X13 to a point X15. It is assumed that X15 is a destination of the movable object 20. When the failure detection unit 230 detects that a failure of the movable object 20 may occur at a point X11 between the point X10 and the point X12, the setting unit 220 sets a point X14 where the dealer for repairing the detected failure exists as a point to be passed by the movable object 20. The notification plan generation unit 240 regenerates a notification plan of the notification data by taking into account the point X14.

For example, the notification plan generation unit 240 generates the notification plan for presenting notification data a, notification data b, notification data c, and notification data d in the stated order before the timing at which the point X12 for switching from the automated driving level 4 to the automated driving level 2 is reached. Here, the notification data a and the notification data b are notification data related to an advertisement. The notification data c is notification data related to a failure. For example, the notification data c is notification data for notification on occurrence of the failure. The notification data d is notification data for notification on the switching from the automated driving level 4 to the automated driving level 2.

In addition, the notification plan generation unit 240 generates a notification plan for presenting notification data e, notification data f, notification data g, and notification data h in the stated order before the timing at which the point X13 for switching from the automated driving level 2 to the automated driving level 4 is reached. Here, the notification data e and the notification data f are notification data related to news. The notification data g is notification data related to a failure. For example, the notification data g is notification data for notification on the presence of a dealer that can repair the failure ahead in the travelling of the movable object 20. The notification data h is notification data for notification on the switching from the automated driving level 2 to the automated driving level 4.

In addition, the notification plan generation unit 240 generates a notification plan for presenting notification data i, notification data j, notification data k, and notification data 1 in the stated order before the timing at which the point X14 where the dealer exists is reached. Here, the notification data i and the notification data j are notification data related to an advertisement. The notification data k and the notification data 1 are notification data related to a failure. For example, the notification data k is notification data for notification on the presence of a dealer that can repair the failure nearby. The notification data 1 is notification data for asking the occupant 80 whether the occupant 80 drops by the dealer.

In addition, the notification plan generation unit 240 generates a notification plan for presenting notification data m, notification data n, notification data o, and notification data p in the stated order before the timing at which the point X15 corresponding to the destination is reached. Here, the notification data m and notification data n are notification data related to an advertisement associated with the destination. The notification data o is notification data related to a failure. For example, the notification data o is notification data for notification on occurrence of the failure. The notification data p is notification data for notification on arrival at the destination.

Note that the notification plan generation unit 240 refers to the information intensity illustrated in FIG. 8, and presents the notification data according to the automated driving level. For example, in the case of travelling at the automated driving level 2 or below, since the occupant 80 may be concentrated on driving, the notification plan generation unit 240 generates a notification plan such that the advertisement C, the news C, and the small talk are not presented. In addition, the notification plan generation unit 240 generates a notification plan such that the information intensity of the notification data presented in predetermined periods from the timing at which each of the points X12, X13, X14, and X15 is reached.

For example, a graph 920 of FIG. 9 indicates a time sequence change of a magnitude of the information intensity. As indicated by the graph 920, the notification plan generation unit 240 generates a notification plan such that the information intensity of the notification data is increased ahead of each of the points X12, X13, X14, and X15. In this manner, the notification data can be set such that the information intensity is gradually increased ahead of the point where the automated driving level is changed, the destination, or the point where the dealer exists is reached. For this reason, attention of the occupant 80 can be gradually focused on the notification data. In this manner, a situation can be established where according to the degree of importance of the information, the occupant 80 does not miss the notification data related to the failure of the movable object 20 or the notification data indicating the switching of the automated driving level.

In this manner, in a case where a failure is detected, the notification plan generation unit 240 regenerates the notification plan to present the notification data related to the failure. For example, the notification plan generation unit 240 regenerates the notification plan to present the notification data related to the failure at the timing close to the timing at which each of the points X12, X13, X14, and X15 is reached. For this reason, a situation can be established where the occupant 80 does not miss the notification data related to the failure.

Figure 10:
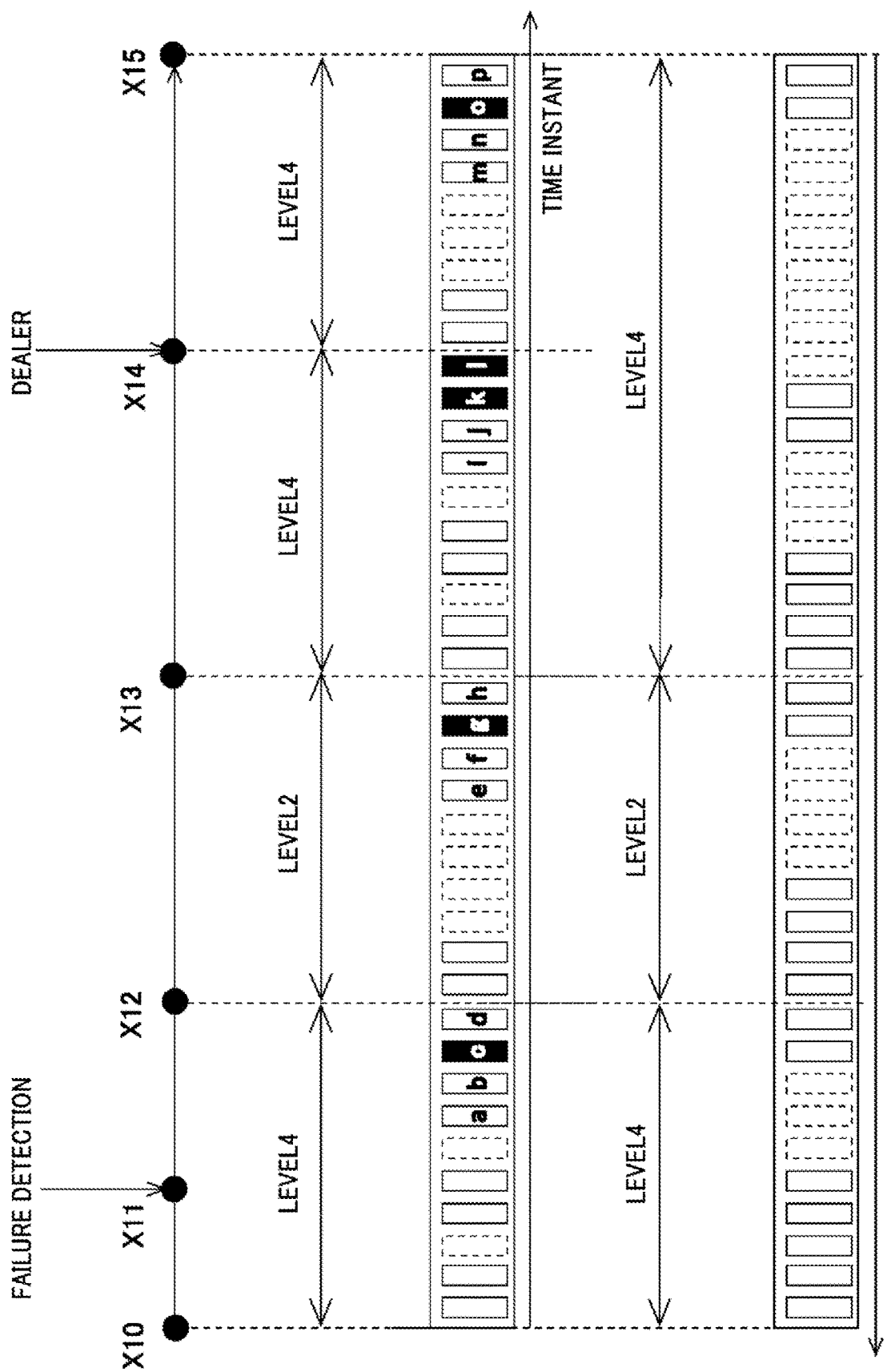
FIG. 10 illustrates one example of notification plans generated in an outgoing travel and an incoming travel.

FIG. 10 illustrates one example of notification plans generated in an outgoing travel and an incoming travel. Since a notification plan for the outgoing travel is the same as the notification plan illustrated in FIG. 9, description thereof will be omitted. In the outgoing travel, it is assumed that the movable object 20 did not drop by at the dealer despite being presented with the notification data related to the failure. For example, it is assumed that the movable object 20 did not stop for a predetermined time or longer at the point where the dealer exists. In this case, the notification plan generation unit 240 generates a notification plan such that the notification related to the failure is suppressed in the incoming travel. FIG. 10 illustrates one example of the notification plan in a case where the notification data related to the failure is not presented in the incoming travel. As illustrated in FIG. 10, the notification plan generation unit 240 generates the notification plan in which a section between the point X15 and the point X13 is set as one management unit without taking into account the point X14 where the dealer exists, and the notification related to the presence of the dealer or the failure is not performed. In this manner, in a case where there is a possibility that the occupant 80 does not wish to deal with the failure at the present moment, the notification related to the failure can be suppressed.

Note that the notification plan generation unit 240 may determine whether to present the notification data associated with the failure in the incoming travel according to the information intensity set by the type of the failure illustrated in FIG. 8. The notification plan generation unit 240 may generate the notification plan for presenting the notification data having the information intensity above a predetermined value among the notification data related to the failure before the point X14 is reached in the incoming travel.

Figure 11:
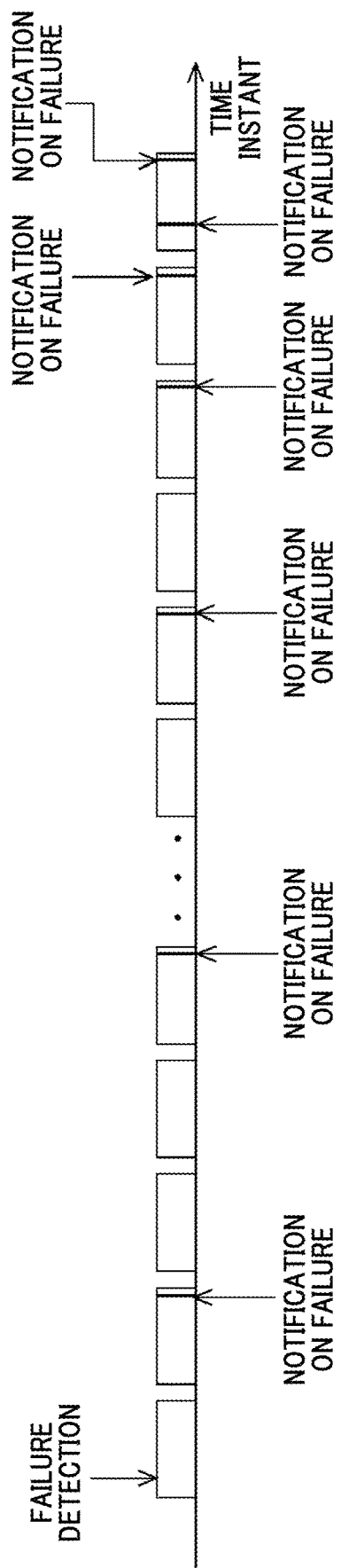
FIG. 11 illustrates one example of a long-term notification plan of notification data which is generated by a notification plan generation unit 240.

FIG. 11 illustrates one example of a long-term notification plan of the notification data which is generated by the notification plan generation unit 240. In a case where it is detected that there is a possibility that a failure occurs after a predetermined period or later in the future, the notification plan generation unit 240 generates a long-term notification plan for presenting the notification data related to the failure. For example, in a case where it is detected that there is a possibility that a failure occurs in half a year with a probability equal to or higher than a predetermined probability, the notification plan generation unit 240 predicts a travel pattern of the movable object 20 for a half year later based on a travel history of the movable object 20, and generates the long-term notification plan for presenting the notification data related to the failure such that a frequency for presenting the notification data related to the failure is gradually increased. For example, the notification plan generation unit 240 generates the long-term notification plan such that as an elapsed time since the failure is detected becomes longer, a time interval for presenting the notification data related to the failure becomes shorter. The notification plan generation unit 240 generates the long-term notification plan such that the notification data related to the failure is presented during the travelling at the automated driving level 4 or above.

As one example, in a case where the movable object 20 is a vehicle, the failure detection unit 230 detects a failure of the sensor included in the movable object 20 based on a steering operation amount of the movable object 20, a vehicle speed of the movable object 20, and a tyre turning amount and a variation of a movable object location in a direction orthogonal to a travelling direction of the movable object 20. For example, in a case where the occupant 80 performs the manual drive, the failure detection unit 230 calculates an ideal value of the variation of the movable object location from the steering operation amount, the vehicle speed, and the tyre turning amount detected by the sensor. In a case where a difference between a measured value of the variation of the movable object location and the ideal value exceeds a predetermined value, the failure detection unit 230 determines that verification drive for detecting a failure of the sensor is performed. For example, the difference between the ideal value and the measured value which is detected during the manual drive may be caused by external disturbance such as wind or an inclination of a road surface.

For example, during the automated drive of the movable object 20, the automated drive control apparatus 22 performs the verification drive for reproducing the steering operation amount, the vehicle speed of the movable object 20, and tyre turning amount carried out during the above-described manual drive, and also measures the variation of the movable object location. In a case where a difference between the measured value of the variation of the movable object location in a case where the verification drive is performed and the ideal value exceeds a predetermined value, the failure detection unit 230 determines that a failure may occur in the sensor in a predetermined period. On the other hand, in a case where the difference between the measured value of the variation of the movable object location when the verification drive is performed and the ideal value is equal to or lower than the predetermined value, the failure detection unit 230 determines that there is no possibility that a failure occurs in the sensor. In this manner, the failure detection unit 230 detects the failure of the sensor configured to detect the operation amount of the actuator included in the movable object 20 based on the output value of the actuator related to the operation of the steering during the automated drive. Since there is no intervention from the occupant 80 during the automated drive, the possibility of the failure of the movable object 20 in the sensor or the like can be accurately determined. Note that the failure of the sensor is one example of the failure of the movable object 20. The failure of the movable object 20 includes a the failure of an auxiliary machine such as an air conditioning apparatus or the like. The failure of the movable object 20 includes a failure based on an air pressure of tyres, the oil amount, or a cooling water amount, or the like.

The movable object 20 is, for example, transport equipment. The transport equipment includes an automobile such as a passenger car or a bus, a vehicle such as a saddle-type vehicle or a bicycle, a robot, or the like.

Note that the movable object 20 may have at least a part of the functions of the notification server 40 described above. For example, the notification apparatus 24 may have the function of the travel road specification unit 210. The notification apparatus 24 may have the function of the setting unit 220. The notification apparatus 24 may have the function of the notification plan generation unit 240.

Figure 12:
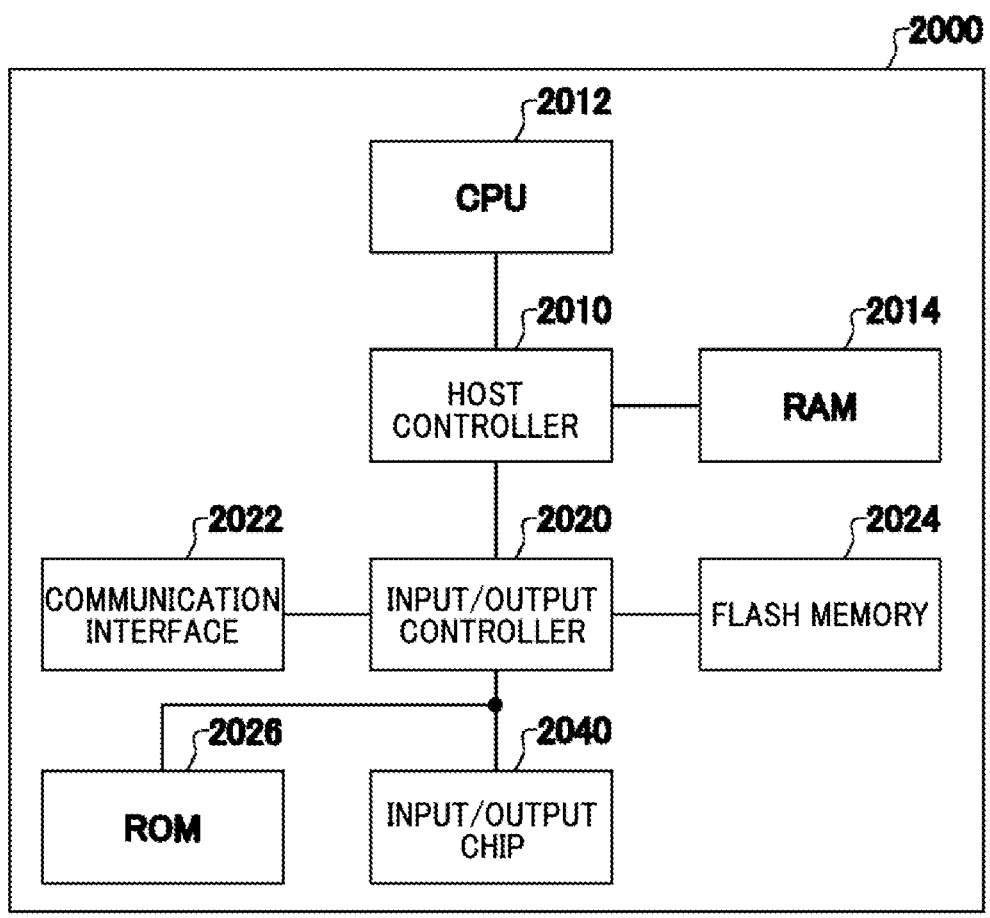
FIG. 12 illustrates an example of a computer 2000.

FIG. 12 illustrates an example of a computer 2000 where a plurality of embodiments of the present invention may be entirely or partially embodied. Programs installed in the computer 2000 can cause the computer 2000 to: function as apparatuses such as the control apparatus 200 according to the embodiments, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in this specification.

The computer 2000 according to this embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, a high-definition multimedia interface (HDMI (registered trademark)) port.

The programs are provided via a network or a computer-readable medium such as a CD-ROM, a DVD-ROM, or a memory card. The RAM 2014, the ROM 2026, or the flash memory 2024 is an example of the computer-readable medium. The programs are installed in the flash memory 2024, the RAM 2014 or the ROM 2026, and are executed by the CPU 2012. Information processing written in these programs is read by the computer 2000, and provides cooperation between the programs and the various types of hardware resources described above. An apparatus or a method may be configured by implementing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing, based on processing written in the communication program. The communication interface 2022, under the control of the CPU 2012, reads transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 or the like, to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and writes back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of said plurality of entries, an entry with the attribute value of the first attribute specified that meets a condition, read the attribute value of the second attribute stored in said entry, and thereby acquire the attribute value of the second attribute associated with the first attribute meeting a predetermined condition.

The programs or software module described above may be stored on the computer 2000 or in a computer-readable medium near the computer 2000. A recording medium such as a hard disk or RAM provided in a server system connected to a dedicated communication network or the Internet can be used as the computer-readable medium. The programs stored in the computer-readable medium may be provided to the computer 2000 via the network.

The program installed in the computer 2000 and causing the computer 2000 to function as the control apparatus 200 may instruct the CPU 2012 or the like to cause the computer 2000 to function as each unit of the control apparatus 200. The information processing written in these programs are read by the computer 2000 to cause the computer to function as each unit of the control apparatus 200, which is specific means realized by the cooperation of software and the various types of hardware resources described above. Then, these specific means implement operations or processing of information corresponding to the intended use of the computer 2000 in this embodiment, so that the control apparatus 200 is constructed as a specific information processing apparatus corresponding to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable medium may include any tangible device capable of storing an instruction executed by an appropriate device, so that the computer-readable medium having the instruction stored thereon constitutes at least a part of a product including an instruction that may be executed in order to provide means to execute an operation specified by a processing procedure or a block diagram. Examples of the computer-readable media may include an electronic storage medium, a magnetic storage medium, an optical storage medium, an electromagnetic storage medium, a semiconductor storage medium, or the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 system
20 movable object
22 automated drive control apparatus
24 notification apparatus
28 communication apparatus
29 sensor
40 notification server
50 content server
80 occupant
90 network
200 control apparatus
210 travel road specification unit
220 setting unit
230 failure detection unit
260 outside world information obtaining unit
240 notification plan generation unit
270 notification control unit
280 storage device
290 communication apparatus
300 road scheduled to be travelled
310 management unit
330 notification data
390 spot
920 graph
2000 computer
2010 host controller
2012 CPU
2014 RAM
2020 input/output controller
2022 communication interface
2024 flash memory
2026 ROM
2040 input/output chip

What is claimed is:

1. A control apparatus for controlling notification data presented to an occupant of a movable object having an automated driving function, the control apparatus comprising:
   at least one processor;
   an outside world information obtaining unit configured to obtain outside world information of the movable object using the at least one processor;
   a failure detection unit configured to detect a failure of the movable object using the at least one processor;
   a setting unit configured to set a point associated with the failure on a road scheduled to be travelled by the movable object according to the road scheduled to be travelled based on the outside world information using the at least one processor, and set a scheduled time instant at which the point will be reached using the at least one processor; and
   a notification plan generation unit configured to generate a notification plan for setting an order for presenting predetermined notification data to the occupant of the movable object according to the point and the scheduled time instant using the at least one processor, wherein
   the notification plan generation unit is configured to estimate an information intensity of the notification data using the at least one processor, and decide an order for presenting detection information of the failure and the notification data in a predetermined period of the scheduled time instant according to the information intensity using the at least one processor.

2. A control apparatus for controlling notification data presented to an occupant of a movable object having an automated driving function, the control apparatus comprising:
   at least one processor;
   an outside world information obtaining unit configured to obtain outside world information of the movable object using the at least one processor;
   a travel road specification unit configured to specify a road scheduled to be travelled by the movable object corresponding to a destination set for the movable object using the at least one processor;
   a failure detection unit configured to detect a failure of the movable object using the at least one processor;
   a setting unit configured to set a first point for switching from automated drive to driver-led manual drive on the road scheduled to be travelled according to the road scheduled to be travelled based on the outside world information using the at least one processor, and set a first scheduled time instant at which the first point will be passed using the at least one processor, set a second point associated with the failure on a road scheduled to be travelled by the movable object according to the road scheduled to be travelled based on the outside world information using the at least one processor, and set a second scheduled time instant at which the second point will be reached using the at least one processor; and
   a notification plan generation unit configured to generate a notification plan for setting an order for presenting predetermined notification data to the occupant of the movable object according to the first point, the second point, the first scheduled time instant, and the second scheduled time instant using the at least one processor, wherein
   the notification plan generation unit is configured to incorporate detection information of the failure into the notification plan according to the first point and the second point using the at least one processor.

3. The control apparatus according to claim 2, wherein the notification plan generation unit is configured to estimate an information intensity of the notification data using the at least one processor, and makes a plan on an order for presenting detection information of the failure and the notification data in a predetermined period of the first scheduled time instant and the second scheduled time instant according to the information intensity using the at least one processor.

4. The control apparatus according to claim 1, wherein the notification plan generation unit is configured to arrange the notification data in an ascending order of the information intensity increasing stepwise in a predetermined period before the scheduled time instant using the at least one processor, and arrange the detection information of the failure to be adjacent to notification data having the information intensity higher than a predetermined value using the at least one processor.

5. The control apparatus according to claim 3, wherein the notification plan generation unit is configured to arrange the notification data in an ascending order of the information intensity increasing stepwise in a predetermined period before the first scheduled time instant and the second scheduled time instant using the at least one processor, and arrange the detection information of the failure to be adjacent to notification data having the information intensity higher than a predetermined value using the at least one processor.

6. The control apparatus according to claim 1, wherein the notification data includes advertisement data, and the information intensity of the detection information of the failure is higher than the information intensity of the advertisement data.

7. The control apparatus according to claim 3, wherein the notification data includes advertisement data, and the information intensity of the detection information of the failure is higher than the information intensity of the advertisement data.

8. The control apparatus according to claim 1, wherein different information intensities are set for the detection information of the failure depending on a type of the failure.

9. The control apparatus according to claim 3, wherein different information intensities are set for the detection information of the failure depending on a type of the failure.

10. The control apparatus according to claim 1, wherein:
    the automated driving function has a plurality of automated driving modes according to an operation amount of an automated drive control apparatus included in the movable object; and
    the notification plan generation unit is configured to set notification data corresponding to the automated driving mode set for the road scheduled to be travelled using the at least one processor.

11. The control apparatus according to claim 2, wherein:
    the automated driving function has a plurality of automated driving modes according to an operation amount of an automated drive control apparatus included in the movable object; and
    the notification plan generation unit is configured to set notification data corresponding to the automated driving mode set for the road scheduled to be travelled using the at least one processor.

12. The control apparatus according to claim 1, wherein a home location can be set for the movable object, and the movable object is provided with an outgoing travel mode where a destination is set in a direction in which the movable object departs from the home location, and an incoming travel mode where a destination is set in a direction in which the movable object approaches the home location, and in a case where a predetermined action is not taken a predetermined number of times or more in response to notification on the detection information of the failure in the outgoing travel mode, the notification plan generation unit is configured to suppress notification on the detection information of the failure in the incoming travel mode using the at least one processor.

13. The control apparatus according to claim 2, wherein a home location can be set for the movable object, and the movable object is provided with an outgoing travel mode where a destination is set in a direction in which the movable object departs from the home location, and an incoming travel mode where a destination is set in a direction in which the movable object approaches the home location, and in a case where a predetermined action is not taken a predetermined number of times or more in response to notification on the detection information of the failure in the outgoing travel mode, the notification plan generation unit is configured to suppress notification on the detection information of the failure in the incoming travel mode using the at least one processor.

14. The control apparatus according to claim 1, wherein:
the failure detection unit is configured to detect a failure expected to occur in the future using the at least one processor; and
when a failure is expected to occur in a predetermined time or later in the future, the notification plan generation unit is configured to generate a notification plan for a period longer than a predetermined length wherein the notification plan is for notification on the failure in a case where the movable object travels at an automated driving level higher than a predetermined automated driving level using the at least one processor.

15. The control apparatus according to claim 14, wherein:
in a case where the movable object travels at the automated driving level higher than the predetermined automated driving level, the failure detection unit is configured to specify timing at which the failure is expected to occur in the future based on an output value of an actuator included in the movable object using the at least one processor; and
the notification plan generation unit is configured to generate a notification plan for a period longer than the predetermined length based on the timing predicted by the failure detection unit using the at least one processor.

16. A non-transitory computer-readable storage medium having recorded thereon a program that causes a computer to function as a control apparatus configured to control notification data presented to an occupant of a movable object having an automated driving function, the program causing the computer to function as:
an outside world information obtaining unit configured to obtain outside world information of the movable object by the computer;
a failure detection unit configured to detect a failure of the movable object by the computer;
a setting unit configured to set a point associated with the failure on a road scheduled to be travelled by the movable object according to the road scheduled to be travelled based on the outside world information by the computer, and set a scheduled time instant at which the point will be reached by the computer; and
a notification plan generation unit configured to generate a notification plan for setting an order for presenting predetermined notification data to the occupant of the movable object according to the point and the scheduled time instant by the computer, wherein
the notification plan generation unit is configured to estimate an information intensity of the notification data by the computer, and decide an order for presenting detection information of the failure and the notification data in a predetermined period of the scheduled time instant according to the information intensity by the computer.

17. A non-transitory computer-readable storage medium having recorded thereon a program that causes a computer to function as a control apparatus configured to control notification data presented to an occupant of a movable object having an automated driving function, the program causing the computer to function as:
an outside world information obtaining unit configured to obtain outside world information of the movable object by the computer;
a travel road specification unit configured to specify a road scheduled to be travelled by the movable object corresponding to a destination set for the movable object by the computer;
a failure detection unit configured to detect a failure of the movable object by the computer;
a setting unit configured to set a first point for switching from automated drive to driver-led manual drive on the road scheduled to be travelled according to the road scheduled to be travelled based on the outside world information by the computer, set a first scheduled time instant at which the first point will be passed by the computer, set a second point associated with the failure on a road scheduled to be travelled by the movable object according to the road scheduled to be travelled based on the outside world information by the computer, and set a second scheduled time instant at which the second point will be reached by the computer; and
a notification plan generation unit configured to generate a notification plan for setting an order for presenting predetermined notification data to the occupant of the movable object according to the first point, the second point, the first scheduled time instant, and the second scheduled time instant by the computer, wherein
the notification plan generation unit is configured to incorporate detection information of the failure into the notification plan according to the first point and the second point by the computer.

18. A control method of controlling notification data presented to an occupant of a movable object having an automated driving function, the control method comprising:
obtaining outside world information of the movable object;
detecting a failure of the movable object;
setting a point associated with the failure on a road scheduled to be travelled by the movable object according to the road scheduled to be travelled based on the outside world information, and setting a scheduled time instant at which the point will be reached; and
generating a notification plan for setting an order for presenting predetermined notification data to the occupant of the movable object according to the point and the scheduled time instant, wherein
the generating includes estimating an information intensity of the notification data, and deciding an order for presenting detection information of the failure and the notification data in a predetermined period of the scheduled time instant according to the information intensity.

19. A control method of controlling notification data presented to an occupant of a movable object having an automated driving function, the control method comprising:
obtaining outside world information of the movable object;
specifying a road scheduled to be travelled by the movable object corresponding to a purpose set for the movable object;
detecting a failure of the movable object;
setting a first point for switching from automated drive to driver-led manual drive on the road scheduled to be travelled according to the road scheduled to be travelled based on the outside world information, setting a first scheduled time instant at which the first point will be passed, setting a second point associated with the failure on a road scheduled to be travelled by the movable object according to the road scheduled to be travelled based on the outside world information, and setting a second scheduled time instant at which the second point will be reached; and generating a notification plan for setting an order for presenting predetermined notification data to the occupant of the movable object according to the first point, the second point, the first scheduled time instant, and the second scheduled time instant, wherein the generating includes incorporating detection information of the failure into the notification plan according to the first point and the second point.

* * * * *